（12） United States Patent
Herzog et al.

(10) Patent No.: US 8,939,123 B2
(45) Date of Patent: Jan. 27, 2015

(54) COUNTERSHAFT

(75) Inventors: Ewald Herzog, Mahlstetten (DE);
Raphael Herzog, Mahlstetten (DE);
Patricia Will, Mahlstetten (DE)

(73) Assignee: Herzog Intertec GmbH, Mahlstetten (DE)

( * ) Notice: Subject to any disclaimer, the term of this patent is extended or adjusted under 35 U.S.C. 154(b) by 356 days.

(21) Appl. No.: 13/387,881

(22) PCT Filed: Jul. 20, 2010

(86) PCT No.: PCT/EP2010/004408
§ 371 (c)(1),
(2), (4) Date: Jan. 30, 2012

(87) PCT Pub. No.: WO2011/012239
PCT Pub. Date: Feb. 3, 2011

(65) Prior Publication Data
US 2012/0125281 A1    May 24, 2012

(30) Foreign Application Priority Data

Jul. 30, 2009   (DE) .................. 10 2009 035 684
Sep. 10, 2009   (DE) .................. 10 2009 040 813

(51) Int. Cl.
*F02B 75/06* (2006.01)
*F16F 15/26* (2006.01)
*F16C 17/02* (2006.01)

(52) U.S. Cl.
CPC .............. *F16F 15/267* (2013.01); *F16C 17/02* (2013.01)
USPC .......... 123/192.2; 123/90.21; 74/603; 74/591

(58) Field of Classification Search
USPC ....................... 123/192.2, 90.21; 74/603, 591
See application file for complete search history.

(56) References Cited

U.S. PATENT DOCUMENTS

| 1,749,807 | A | 3/1930 | Ford |
| 2,838,957 | A | 6/1958 | Johnson |

(Continued)

FOREIGN PATENT DOCUMENTS

| DE | 19835145 A1 | 2/2000 |
| DE | 10115536 A1 | 10/2001 |

(Continued)

OTHER PUBLICATIONS

ATZ Online website, www.atzonline.de, dated Jan. 13, 2004.

(Continued)

*Primary Examiner* — Noah Kamen
*Assistant Examiner* — James Kim
(74) *Attorney, Agent, or Firm* — Kriegsman & Kriegsman

(57) ABSTRACT

The invention relates to a countershaft for a single or multiple cylinder motor having at least one unbalanced weight section (21, 22; 23, 24) and at least one bearing point (16, 17) that is allocated to the at least one unbalanced weight section (21, 22; 23, 24), wherein the bearing point (16, 17) has a radial circumferential surface (18) that extends only partially over a circumference of the bearing point (16, 17) so that a centrifugal force resulting from rotation of the countershaft (11) lies within a region of the bearing point (16, 17) that is formed by the circumferential surface (18) extending partially over the circumference of the bearing point (16, 17) and having a ring (25) that surrounds the partially extended circumferential surface (18) of the bearing point (16, 17) and is connected by a force and/or form and/or material fitting connection to the bearing point (16, 17), wherein the circumferential surface (18) of the bearing point (16, 17) has a receptacle region (33) for receiving the ring (25) and at least one axial outer edge region or at least one ring-shaped region of the ring (25) is connected at least to one contact surface (37) of the receptacle region (33) in a force and/or form and/or material fitting manner. (Refer to FIG. 5.)

15 Claims, 8 Drawing Sheets

(56) References Cited

U.S. PATENT DOCUMENTS

| | | |
|---|---|---|
| 3,673,651 A | 7/1972 | Stewart |
| 3,748,925 A | 7/1973 | Stewart |
| 4,028,963 A | 6/1977 | Nakamura et al. |
| 4,617,885 A | 10/1986 | Oshiro et al. |
| 5,293,684 A | 3/1994 | Fry |
| 5,791,309 A | 8/1998 | Yamazaki et al. |
| 6,405,702 B2 | 6/2002 | Takano et al. |
| 6,581,495 B2 | 6/2003 | Cagney |
| 6,626,063 B2 | 9/2003 | Killion |
| 6,659,060 B2 | 12/2003 | Linder et al. |
| 6,708,663 B1 | 3/2004 | Stuckler |
| 6,732,694 B2 | 5/2004 | Holweg |
| 6,854,358 B1 | 2/2005 | Stuckler |
| 6,971,361 B2 | 12/2005 | Lawrence |
| 7,444,976 B2 * | 11/2008 | Hofheinz et al. ......... 123/192.2 |
| 7,506,628 B2 | 3/2009 | Marzy et al. |
| 7,617,810 B1 | 11/2009 | Phillips et al. |
| 7,628,133 B2 | 12/2009 | Tisch et al. |
| 7,647,910 B2 * | 1/2010 | Solfrank ................... 123/192.2 |
| 8,191,527 B2 * | 6/2012 | Solfrank et al. ........... 123/192.2 |
| 8,387,584 B2 * | 3/2013 | Solfrank ................... 123/192.2 |
| 8,413,629 B2 * | 4/2013 | Herzog et al. ............ 123/192.2 |
| 8,413,630 B2 * | 4/2013 | Herzog et al. ............ 123/192.2 |
| 8,413,631 B2 * | 4/2013 | Herzog et al. ............ 123/192.2 |
| 2001/0029919 A1 | 10/2001 | Cagney et al. |
| 2002/0017263 A1 | 2/2002 | Linder et al. |
| 2004/0079316 A1 | 4/2004 | Lawrence |
| 2005/0284254 A1* | 12/2005 | Hawkins et al. ................ 74/603 |
| 2010/0296762 A1* | 11/2010 | Waseda ........................ 384/548 |

FOREIGN PATENT DOCUMENTS

| | | |
|---|---|---|
| DE | 10257562 A1 | 7/2004 |
| DE | 10347348 A1 | 5/2005 |
| DE | 102007027990 A1 | 12/2008 |
| EP | 0753678 A2 | 1/1997 |
| EP | 0789166 A1 | 8/1997 |
| EP | 1081410 A1 | 3/2001 |
| EP | 1775484 A2 | 4/2007 |
| EP | 2014935 A1 | 1/2009 |
| EP | 2017486 A1 | 1/2009 |
| FR | 2 619 881 A1 | 3/1989 |
| FR | 2823279 A1 | 10/2002 |
| JP | 54139936 U | 9/1979 |
| JP | 56056947 A | 5/1981 |
| JP | 58039830 A | 3/1983 |
| JP | 07217638 A | 8/1995 |
| JP | 09151993 A | 6/1997 |
| JP | 11 101311 A | 4/1999 |
| JP | 2001074105 A | 3/2001 |
| JP | 2001140985 A | 5/2001 |
| JP | 2003035349 A | 2/2003 |
| JP | 2005016644 A | 1/2005 |
| JP | 2006002852 A | 1/2006 |
| JP | 2009210134 A | 9/2009 |
| WO | 2005093286 A1 | 10/2005 |

OTHER PUBLICATIONS

FEV—Spectrum Technologie Highlights aus dem FEV Arbeitsspektrum, Ausgabe Apr. 23, 2003.

Reibleistungsreduktion aus MTZ 7-8/2005 (Reduction of Friction Power disclosed in MTZ 7-8/2005).

English translation of the relevant portion of an Office Action dated Jul. 24, 2012, in Japanese Patent Application No. 2010-511517, which is the corresponding Japanese patent application to U.S. Patent No. 8,413,630.

English translation of the relevant portion of an Office Action dated Oct. 2, 2012, in Japanese Patent Application No. 2010-511516, which is the corresponding Japanese patent application to U.S. Patent No. 8,413,631.

* cited by examiner

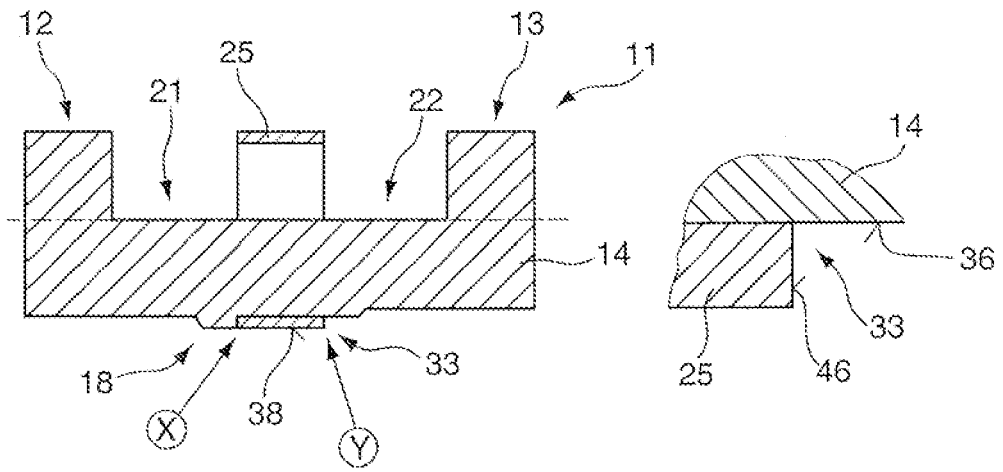
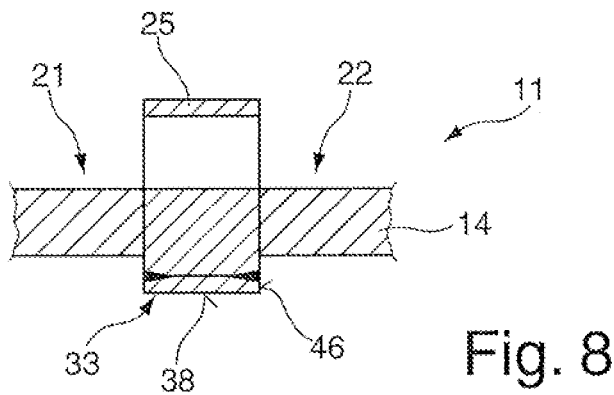
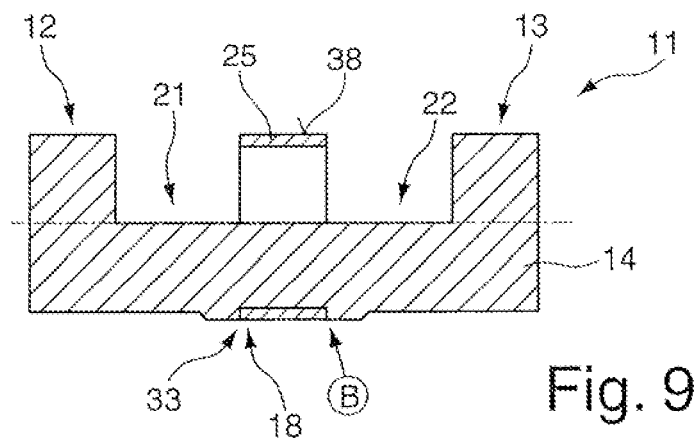

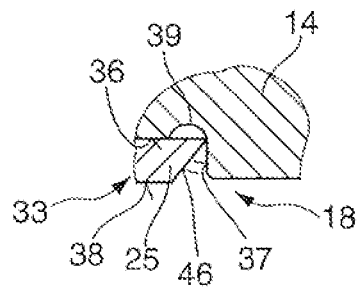
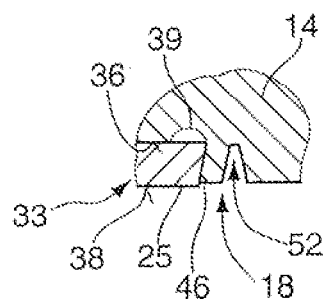
Fig. 10a
Fig. 10b
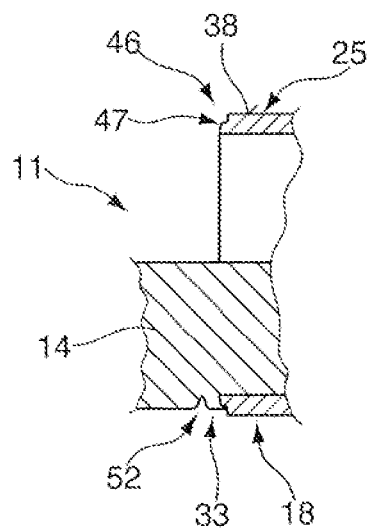
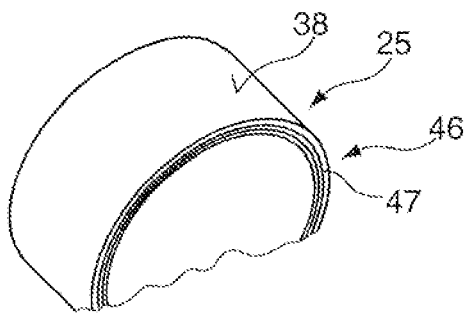
Fig. 10c
Fig. 10d
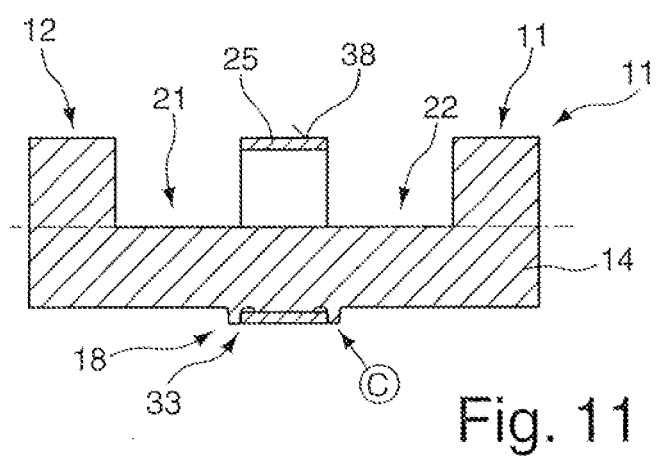
Fig. 11

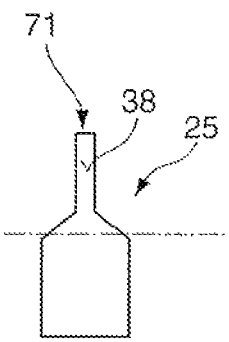 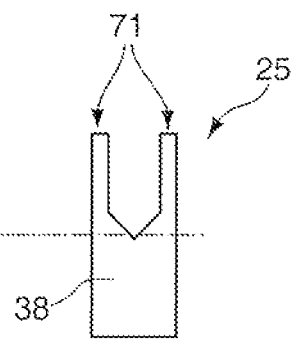
Fig. 15a    Fig. 15b
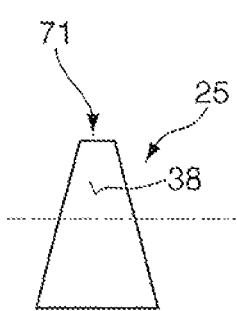 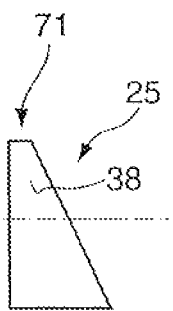
Fig. 15c    Fig. 15d
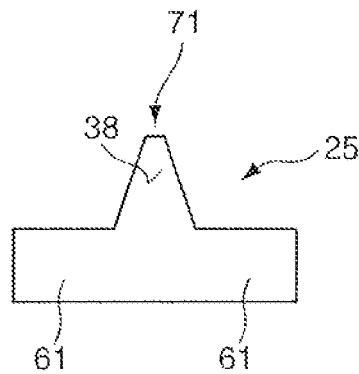
Fig. 15e

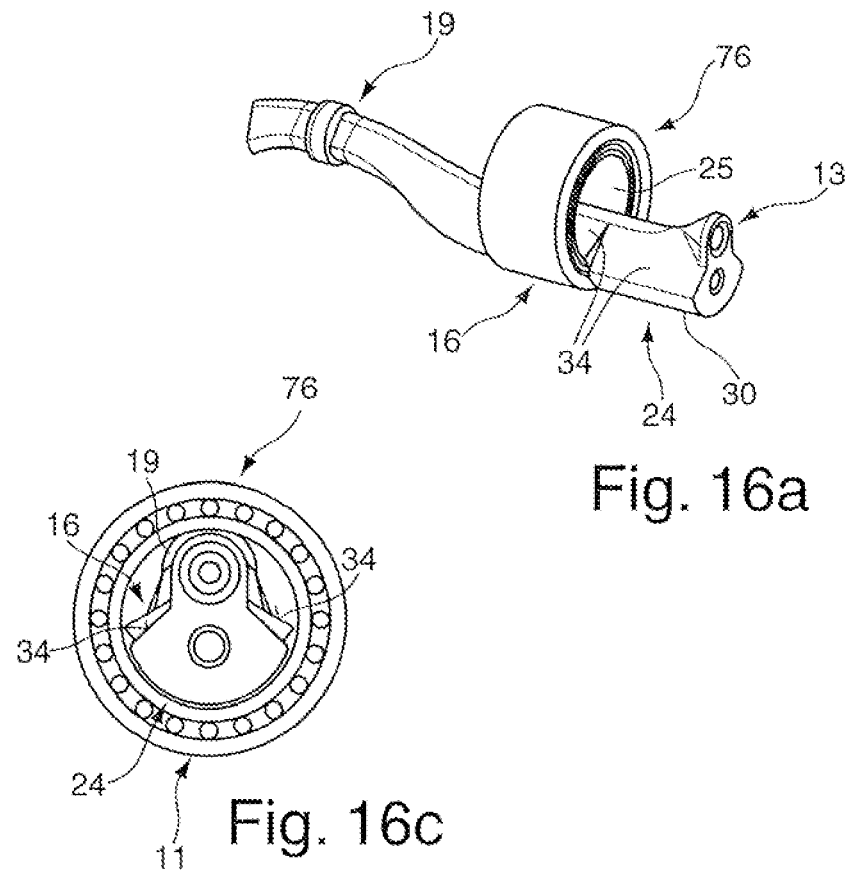
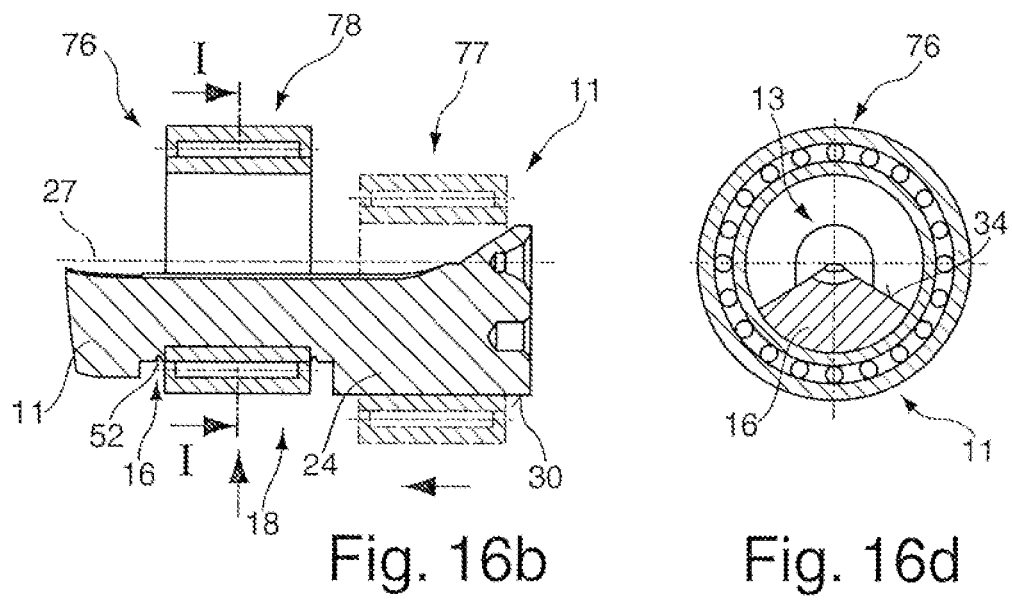
Fig. 16a
Fig. 16c
Fig. 16b
Fig. 16d

COUNTERSHAFT

The invention relates to a balancing shaft for a single- or multi-cylinder engine comprising at least one unbalanced weight portion and at least one bearing point according to the preamble of claim 1.

A balancing shaft for a single- or multi-cylinder engine comprising at least one unbalanced weight portion and at least one bearing point is known from WO 2007/121861 A1, which bearing point is associated with the at least one unbalanced weight portion. The bearing point comprises a running surface or peripheral surface which extends, only in part, over a periphery of the bearing point so that a centrifugal force resulting from rotation of the balancing shaft is situated in a region of the bearing point which is formed by the peripheral surface extending, in part, over the periphery of the bearing point. In one embodiment of this balancing shaft the bearing point is provided with a raceway which surrounds the partially formed peripheral surface of the bearing point so that a closed running surface is enabled with a reduction of the rotating masses in the area of the bearing point. This raceway is connected to the running surface on the partially formed peripheral surface of the bearing point by a non-positive and/or positive and/or cohesive joint. Owing to the constant requirements placed on load-bearing capacity and precision, it is necessary to further develop such balancing shafts.

The object of the invention is therefore to propose a balancing shaft for a single- or multi-cylinder engine comprising at least one unbalanced weight portion and at least one bearing point, wherein the raceway is to be connected, in a simple manner, to the partially formed peripheral surface of the bearing point by a non-positive and/or positive and/or cohesive joint, and wherein it is possible to intensify lightweight construction whilst retaining the use as a sliding bearing by a closed hydrodynamic lubricating film or the formation of a rolling bearing in the engine housing.

This object is achieved in accordance with the invention by the features of claim 1. Further advantageous embodiments and developments are disclosed in the other claims.

Owing to the design according to the invention of a balancing shaft in which the peripheral surface of the bearing point has a receiving region for receiving the raceway, which receiving region has at least one contact surface, preferably a contact surface extending in the radial direction, it is possible for the raceway to be positioned precisely in relation to the bearing point so as to create the non-positive and/or positive and/or cohesive joint. At the same time, the precise positioning remains by a simple production of the balancing shaft which is supplemented by the receiving region. Furthermore, an axial positioning and/or fixing of the raceway in relation to the balancing shaft is provided in a simple manner by the receiving region having at least one contact surface which is preferably oriented in the radial direction. In addition, a further reduction in the volume of the balancing shaft in the region of the bearing point can be provided by the receiving region, which is preferably located at, on or in the peripheral surface of the bearing point. In accordance with a first alternative according to the invention it is made possible, as a result of the receiving regions in the peripheral surface of the bearing point, for one of the two outer axial edge regions of the raceway for example to be used for the non-positive and/or positive and/or cohesive joint. In a further alternative embodiment in accordance with the invention the receiving region is formed at or on the peripheral surface of the bearing point in such a way that at least a central region of the raceway is provided for the non-positive and/or positive and/or cohesive joint.

This variable and versatile design of the receiving region at, in or on the peripheral surface of the bearing point makes it possible to receive different shapes and contours of a raceway with a secure non-positive and/or positive and/or cohesive fit.

In accordance with a preferred embodiment of the invention, at least one reverse-drawn surface is provided adjacent to the peripheral surface of the bearing point in the peripheral direction and reduces the cross-sectional area of the bearing point. This reverse-drawn surface makes it possible to draw the raceway over the balancing shaft in a simple manner so as to position the raceway relative to the bearing point before it is placed in the recessed receiving region.

The receiving region is preferably formed in a recessed manner in relation to the peripheral surface of the bearing point and comprises at least one contact surface, which is annular and extends along the width of the receiving region, but only in part. It is thus ensured that contact is provided between the inner peripheral surface of the raceway and the bearing point or the contact surface of the recessed receiving region.

In accordance with a further preferred embodiment of the invention the contact surface of the receiving region is displaced radially inwardly in relation to the peripheral surface, in such a way that the running surface of the raceway is raised in relation to the peripheral surface adjacent to the receiving region. It is thus possible to provide an optimal supporting and retaining force between the raceway and the bearing point.

In accordance with a further preferred embodiment of the invention a radial contact surface of the receiving region bears against an axial side face of the receiving region and forms a contact shoulder. In this embodiment only a radially inner edge region of the raceway thus bears against a shoulder formed in the receiving region, wherein at least one further recess is provided between the shoulders so that a defined contact for the raceway is provided in the recessed receiving region, only in the outer edge region.

In a preferred embodiment of the invention at least one axial side face of the raceway is positioned on at least one axial side face of the receiving region. This embodiment, in which an axial side face of the raceway bears against an axial side face of the receiving region and is positioned thereon, enables a sort of one-sided bearing of the raceway. In this embodiment the raceway is preferably connected to the main body or the receiving region arranged thereon by a welded joint or a bonded joint. In an alternative embodiment both axial end faces of the raceway are positioned against the axial side face of the receiving region by a press fit. A secure positioning of the raceway in relation to the bearing point can thus be ensured. In addition, a further joining process may be carried out after the positioning by press fit, without the need for further tools.

A welded joint or soldered joint is preferably provided along at least a region between the peripheral surface and the region projecting radially from the receiving region of the axial end face of the raceway. A laser weld is preferably provided so that a low penetration depth of the heat generated by the welding process is provided both in the raceway and in the peripheral surface of the balancing shaft.

In accordance with a preferred embodiment of the invention the raceway, which can be placed in the receiving region (recessed in particular), and treated by a hardening procedure, comprises an untreated, preferably unhardened shoulder region, in particular an axial end face and an inner peripheral edge region. It is thus possible to weld between the raceway and the main body of the balancing shaft. The raceways are preferably hardened by a hardening procedure in such a way that at least an end and inner edge region of the edge region of the raceway is not affected by the hardening procedure, and therefore effective weldability is retained.

In accordance with a further alternative embodiment of the invention the contact surface of the receiving region is preferably raised or radially prominent in relation to an adjacent portion of the balancing shaft. The width of the contact surface of the receiving region is preferably adapted to the width of the raceway, at least in the region of the contact surface, viewed in the radial direction in relation to the main body. For example, a radially extending weld seam may be formed between the contact surface of the receiving region and the raceway bearing thereagainst. With a contact surface protruding in relation to the main body, this embodiment makes it possible for merely the region supporting the raceway from its inner face to protrude.

In a further alternative embodiment of the invention a peripheral recess or undercut is provided between the contact surface of the receiving region and the axial side faces. For example, effective contact between the inner periphery of the raceway and the receiving region can thus be achieved. This embodiment of the recess between the axial side faces and the contact surface of the receiving space is preferably used with a fixing of the raceway in the preferably recessed seat by a flange. For this purpose the edge region of the peripheral surface is preferably formed with a peripheral bead which is machined by a mortising or flanging process in such a way that an edge region of the raceway is held fixed in position in relation to the recessed receiving area.

For simplified encompassing of the edge region of the raceway and for positional fixing of the raceway in the receiving region it is preferable for an axial end face of the raceway to be inclined from the inner peripheral surface towards the outer peripheral surface or towards the running surface of the raceway. The end face of the raceway thus first engages behind an edge region of the peripheral surface after the flange and is held securely therein.

In order to increase the retaining force of the raceway in the recessed receiving region in relation to the bearing point during fixing by the flange, a contour such as single- or multi-stepped shoulder which is peripheral, at least in part, is preferably provided on the end face of the raceway. Alternatively, the contour may also comprise one or more conical faces, curved surface portions or any combination of the aforementioned contours so as to form the undercutting contour at the axial end face of the raceway. After the flange, a positive and non-positive joint is thus formed between the edge region of the peripheral surface and the opposite edge region of the raceway, in particular the axial end face of the raceway. The contour or shoulder may be formed with an adjustable height in the peripheral direction, for example by an undulating or stepped extension. The receiving position can thus also be additionally secured in the radial direction.

In accordance with a further alternative embodiment of the invention the raceway comprises a support portion on its running surface, which support portion is adjacent in the axial direction and extends, at least in part, in the radial direction but is not completely peripheral. This support portion or else fastening portion makes it possible to create an enlarged contact surface of the raceway at or in the receiving region, wherein the raceway itself may be narrower in terms of its peripheral running surface in the axial direction of extension. Such an embodiment affords the advantage that, for example, a very narrow running surface can be formed in relation to the receiving region, that is to say in relation to the unbalance, since only low, or else no supporting forces have to be taken up in this region. At the same time, a reduction in weight can in turn be achieved as a result. Nevertheless, a sufficiently large fastening region is provided by the support surface.

This additional support portion or fastening portion on the raceway is preferably connected to the main body via at least one radial or axial end face. This fastening affords the advantage that the raceway and the main body can be connected in a region outside the running surface of the raceway, and therefore simplified fastening is enabled. The previously descried non-positive, positive or cohesive joint can be used in this case. Alternatively, the support portion or fastening portion may be connected to the main body by spot welds, rivets or screws in a region outside the running surface of the raceway. Furthermore, such an arrangement also enables a clamped connection, in which further clamping elements engage at the end faces, which in particular are axial, of the support or fastening portions and position and fix said portions in relation to the receiving region by clamping.

The object on which the invention is based is further achieved by a balancing shaft for a single- or multi-cylinder engine which comprises the following features:

The balancing shaft comprises at least one unbalanced weight portion and at least one bearing point, which is associated with the at least one unbalanced weight portion, wherein the bearing point comprises a peripheral surface which extends, only in part, over a periphery of the bearing point so that a centrifugal force resulting from rotation of the balancing shaft is situated in a region of the bearing point which is formed by the peripheral surface extending, in part, over the periphery of the bearing point. The balancing shaft comprises a raceway which surrounds the partially formed peripheral surface of the bearing point and is connected to the bearing point by a non-positive and/or positive and/or cohesive joint. The balancing shaft further comprises a radial peripheral surface of the bearing point having a peripheral angle of less than 180°. This balancing shaft makes it possible to achieve a lighter design. In addition, a main body of the balancing shaft can be produced by simple manufacture as a result of such a design.

A reinforcing contour preferably extends between the radial ends of the peripheral surface of the bearing point. This reinforcing contour may be formed as a function of the required overall rigidity of the balancing shaft in the region of the bearing point. This reinforcing contour can be adapted accordingly.

A roof-like reinforcing contour is preferably provided. This roof-like reinforcing contour may, for example, be formed as a gable roof, a pitched roof, a hip roof, or a barrel roof, and as a conical broach roof or a mansard roof. Furthermore, a reinforcing contour may alternatively be provided which extends in the opposite direction to the peripheral surface of the bearing point. Further polygonal or curved reinforcing contours may also be provided.

Together with the peripheral surface, the reinforcing contour preferably forms a cross-sectional area of the bearing point, wherein the axis of rotation lies outside the cross-sectional area or is adjacent to the reinforcing contour. A particularly rigid arrangement can thus be provided.

The other embodiments of the balancing shaft disclosed in the dependent claims, in which a receiving region is provided for the peripheral surface of the bearing point to receive the raceway, also apply to a balancing shaft having a peripheral surface of the bearing point which has a peripheral angle of less than 180°.

In a further alternative embodiment of the invention the raceway arranged at the bearing point comprises a raceway which has a running surface which is reduced in width. This reduced width may be formed by a symmetrical or asymmetrical reduction in width compared to the width of the raceway in the region in which the centrifugal force acts. Two or more reduced raceway widths may also be formed in a region of the bearing point opposite the centrifugal force.

Furthermore, the raceway arranged on the bearing point is preferably an inner ring of a rolling bearing which can be fixed on the receiving region. The balancing shaft can thus preferably be equipped with a complete rolling bearing before said balancing shaft is incorporated into an engine block. With regard to the rolling bearings, the designs typical of rolling bearings in terms of application and design of the bearing in the engine block may be selected. Different radial bearings, such as deep groove ball bearings or cylindrical roller bearings as well as needle bearings or the like can thus be used.

In accordance with a further preferred embodiment of the invention an end portion and/or an unbalanced weight portion adjacent thereto and/or a bearing point of the balancing shaft adjacent thereto may each have a reverse-drawn diameter which is smaller than the inner diameter of the raceway or the inner ring of the rolling bearing. An axial positioning of the raceway over the balancing shaft is thus first ensured, so as to then position the raceway relative to the bearing point, in particular in the receiving seat of the bearing point, by a vertical movement so that said raceway is then joined in a non-positive and/or positive and/or cohesive manner. The geometries of the end portion of the unbalanced weight portion and of the bearing point can be adapted, independently of one another, to the respective loads to be taken up or to the compensating forces.

The reverse-drawn diameter of the unbalanced weight portion is preferably formed by a peripheral surface having at least one reverse-drawn surface. The unbalanced weight portions generally have a cross-section which is approximately shaped in the form of a segment of a circular arc and is formed by at least two reverse-drawn surfaces and the peripheral surface. The same may apply to the shape of the bearing point. In some embodiments a further reverse-drawn surface may preferably be provided in the form of a flattened portion, curvature or the like between the peripheral surface and the reverse-drawn surface adjacent thereto so as to meet the requirements that the reverse-drawn diameter of the raceway, which also corresponds to the inner ring of the rolling bearing, is slightly smaller than the inner diameter of the raceway.

The invention and further advantageous embodiments and developments thereof will be described and explained in greater detail hereinafter with reference to the examples illustrated in the drawings. The features to be derived from the description and the drawings may be applied in accordance with the invention either individually or together in any combination. In the drawings:

FIG. 6b is a schematic enlarged detailed view of an alternative embodiment to FIG. 6a;

FIG. 7a is a schematic sectional view of an alternative balancing shaft to FIG. 5;

FIG. 7b is a schematic enlarged partial view of a detail Y according to FIG. 7a;

FIG. 8 is a schematic sectional view of an alternative embodiment to FIG. 5;

FIG. 9 is a schematic sectional view of a further alternative balancing shaft to FIG. 5;

FIG. 10a is an enlarged schematic view of a detail B according to FIG. 9 before caulking;

FIG. 10b is an enlarged schematic view of a detail B according to FIG. 9 after caulking;

FIGS. 10c and 10d are enlarged schematic partial views of a side face of a raceway;

FIG. 11 is a schematic sectional view of a further alternative balancing shaft according to FIG. 5;

FIGS. 14a to 14e are schematic views of further alternative embodiments for alternative balancing shafts according to FIG. 13a;

FIGS. 15a to 15e are schematic side views of alternative embodiments of the raceways for a balancing shaft; and FIGS. 16a to 16d show a partial perspective view and sectional views of a further alternative embodiment of the balancing shaft.

Figure 1:
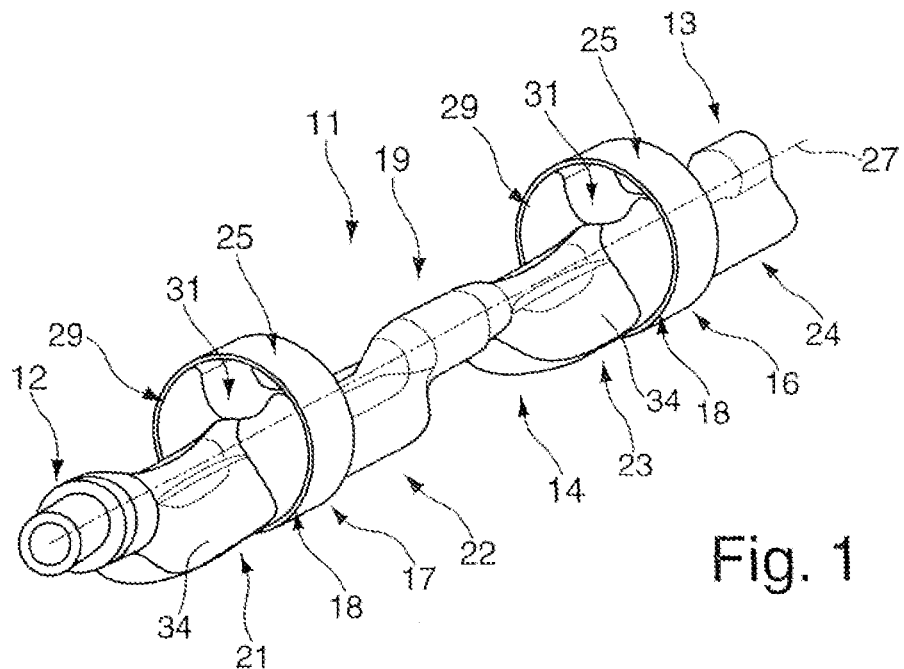
FIG. 1 is a perspective view of an embodiment according to the invention of a balancing shaft.

FIG. 1 shows a perspective view of an embodiment of a balancing shaft 11. Such a balancing shaft 11 is provided for a single- or multi-cylinder engine and compensates for inertia forces of the second order. Normally, in multi-cylinder engines, two balancing shafts 11 are arranged offset from one another and rotate in opposite directions at double engine speed. A drive (not shown in greater detail), such as a chain wheel is provided on an end portion 12 of the balancing shaft 11 shown in FIG. 1 and drives the balancing shaft 11. The balancing shaft 11 comprises a main body 14, on which a first and second bearing point 16 and 17 are provided. These are used to mount the balancing shaft 11 in an engine block. These bearing points 16, 17 have a peripheral surface 18, the peripheries of which are preferably formed as a periphery of the other portions of the main body 14. The balancing shaft 11 can thus be easily inserted into the bearing or bearing boxes in the engine block, more specifically with an end portion 13 at the front.

In this embodiment of the balancing shaft 11, the main body comprises unbalanced weight portions 21 to 24 symmetrically about the first and second bearing points 16, 17. The unbalanced weight portions 21 to 24 are preferably formed, at least over portions, by a peripheral surface 30 and two reverse-drawn surfaces 34 which, in particular, form a cross-section shaped in the manner of a segment of an arc. Flowing transitions are preferably provided between the end portions 12, 13 and the bearing points 16, 17 as well as the unbalanced weight portions 21 to 24. When dimensioning the unbalanced weight portions 21 to 24, the end portions 12 and 13 are also taken into account. A connection portion 19 is formed between the unbalanced weight portions 22 and 23 and connects the symmetrical arrangement of the first and second bearing points 16, 17.

The first and second bearing points 16, 17 have a peripheral surface 18 extending, in part, over the periphery of the bearing points 16, 17 and which may preferably be formed at a peripheral angle of 180° to 359° in accordance with the first embodiment. Alternatively, these peripheral surfaces 18 may also extend at a peripheral angle of less than 180°, as illustrated in FIGS. 13a to c, 14a to e and 16a to d. A "partial bearing point" is formed in both embodiments.

Figure 3:
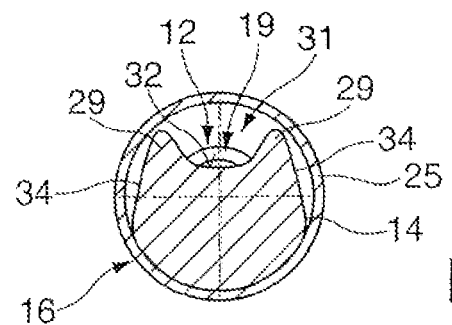
FIG. 3 is a schematic sectional view along the line II-II in FIG. 2.

The first and second bearing points 16, 17 are each surrounded by a raceway 25 which radially surrounds the peripheral surface 18. The balancing shaft 11 can thus be inserted in an engine block, together with such a raceway 25, using a previous bearing arrangement, wherein the raceway 25 can be used both with a slide bearing, in particular a roller bearing, and with a rolling bearing. Alternatively, the raceway 25 may also be an inner ring of a complete rolling bearing, and the balancing shaft 11 may be inserted into the engine block with the at least one rolling bearing fixed thereon. At the same time, a saving in weight at the bearing point 16, 17 may be provided as a result of this arrangement owing to a recess 31 formed between the raceway 25 and the bearing point 16, 17. For example and as shown in FIG. 3, the recess 31 may be formed in a cup-like or dish-like manner. This embodiment is preferably provided with a bearing point 16, 17 which has a peripheral angle greater than 180°. With a peripheral angle of 180°, a planar surface is provided which is situated in an axis of rotation 27. Alternatively, such a planar surface may also lie above or below the axis of rotation 27. With a peripheral angle of less than 180°, the recess 31 may be roof-shaped if part of the main body extends as far as the axis of rotation or beyond the axis of rotation.

With regard to the further possibilities for designing a balancing shaft 11, the disclosure of WO 2007/121861 A1 is incorporated herein by reference. The embodiments of the balancing shaft 11 and of the main body may also be provided in the present invention.

Figure 2:
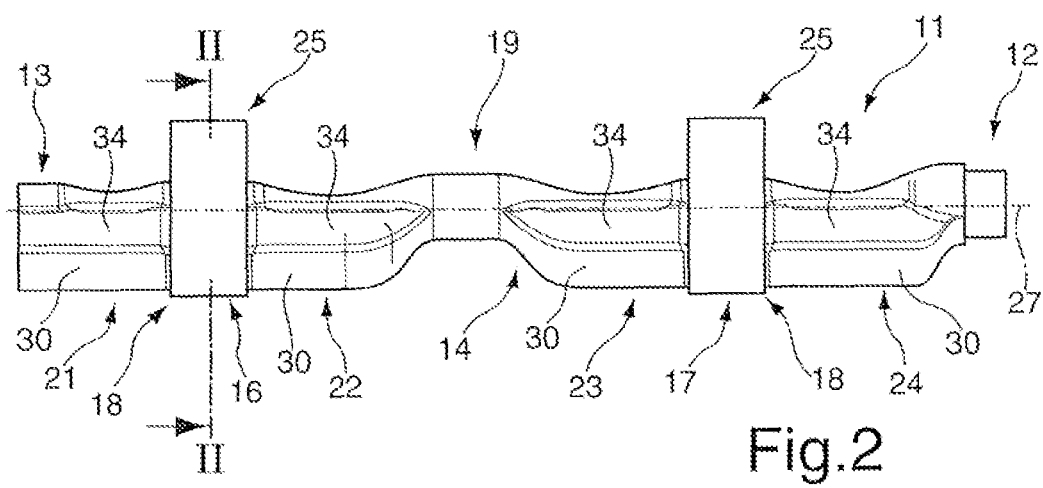
FIG. 2 is a schematic side view of the balancing shaft according to FIG. 1.
Figure 4:
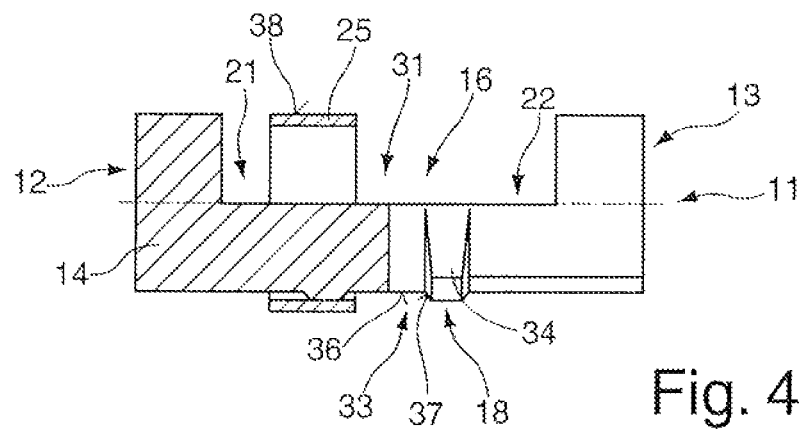
FIG. 4 is a schematic view of a simplified balancing shaft according to FIG. 1 in partial longitudinal section during an assembly process of the raceway at the bearing point.
Figure 5:
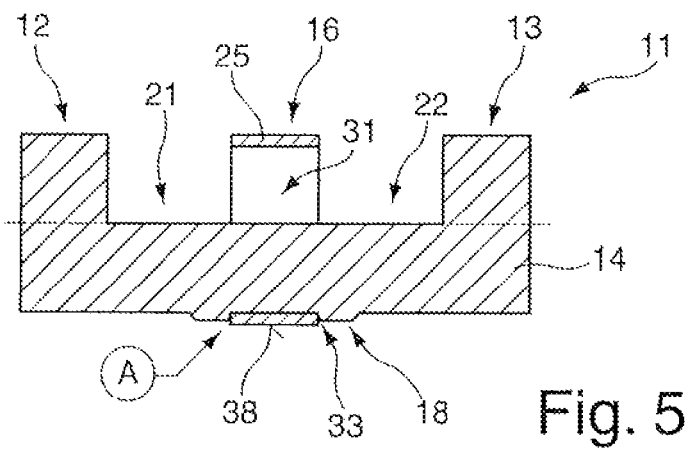
FIG. 5 is a schematic longitudinal sectional view of the balancing shaft according to FIG. 1.

The balancing shaft 11 according to the invention in accordance with FIGS. 1 to 3 comprises a recessed receiving region 33 in the bearing points 16, 17 to receive and position the raceway 25, as is shown in FIG. 4 in a sectional view during assembly of the raceway 25 on the balancing shaft 11, and as shown in FIG. 5 in a largely simplified schematic longitudinal sectional view of the balancing shaft according to FIG. 1. This recessed receiving region 33 is formed in the peripheral surface 18 of the bearing points 16, 17. The recessed receiving region 33 is consequently delimited at or adjoins the peripheral surface 18, in each case by a portion of the peripheral surface 18, viewed in the axial direction. Viewed in the radial direction, the peripheral surface 18 of the bearing point 16, 17 comprises a reverse-drawn surface 34 which is formed by a reduction in the peripheral cross-section so as to allow the raceway 25 to be drawn over the main body 14 of the balancing shaft 11 and so as to position the raceway 25 in the recessed receiving region 33 of the bearing point 16, 17, as illustrated in FIG. 4.

The recessed receiving region 33 comprises a radially oriented contact surface 36, which is recessed in relation to a peripheral face 18 or has a smaller diameter. Axial side faces 37 are thus formed, as a result of which the recessed receiving region 33 is groove-like or U-shaped or dish-shaped or the like. The contact surface 36 is recessed in relation to the peripheral surface 18 so that a raceway 25 positioned in the receiving region 33 is elevated via its running surface 38 in relation to the peripheral surface 18. The raceway 25 is thus positioned correctly in the receiving region 33 in the axial direction. Viewed in the radial peripheral direction, it is possible to see a position of engagement between the raceway 25 and the receiving region 33 according to the peripheral angle of the bearing point and the size of the reverse-drawn surface 34.

To insert the raceway 25 into the main body 14 of the balancing shaft 11, the raceway 25 is preferably pre-treated by a hardening procedure before insertion, but an outer edge region of the raceway 25, in particular the axial side face 46 and an adjacent edge region of an inner periphery is not pre-treated or remains untreated so as to ensure weldability. After the pre-treatment by a hardening procedure the raceway 25 is drawn over the main body 14 of the balancing shaft 11 and positioned in relation to the receiving region 33. The raceway 25 is then preferably placed in the receiving region 33 and in particular is pressed in so that a non-positive and/or positive fit is provided. A cohesive joint between the raceway 25 and the receiving region 33 is then formed, wherein a laser welding process is selected in particular. The balancing shaft 11 is fixed between points so that the further operating steps, such as cylindrical grinding and finishing of the bearing seats can be carried out.

Figure 6A:
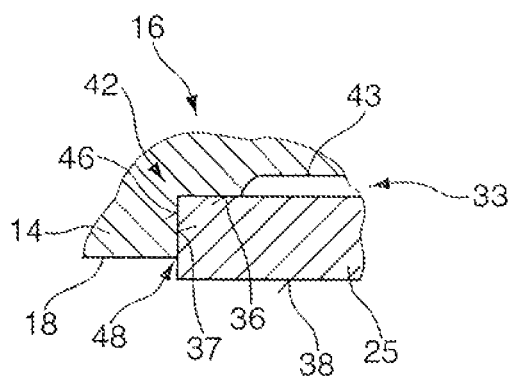
FIG. 6a is a schematic enlarged view of a detail A according to FIG. 4.

FIG. 6a shows an enlarged schematic detailed view of a corner region of the receiving region 33 denoted by A in FIG. 5. In this first alternative embodiment the contact surface 36 is annular and bears against the side face 37 so that a peripheral shoulder 42 is formed. A further recess 43 is provided between the two shoulders 42 formed to the left and right in the receiving region 33 so that the raceway 25 rests against the shoulder 42 of the receiving region 33 merely by a radially outer edge region. A press fit is preferably formed between the axial end face 46 of the raceway 25 and the side face 37 of the receiving region 33 after insertion of the raceway 25 in the receiving region 33, as a result of which the raceway 25 is pre-fixed, at least in the receiving region 33. A gap formed between the side face 37 and the end face 46 may then be closed by a weld seam 48 which preferably penetrates through, at least over portions, such that the raceway 25 is cohesively joined to the main body 14. Laser welding is preferably provided.

In an alternative embodiment of the receiving region 33, not shown in greater detail, the side face 37 is inclined outwardly in relation to a radial plane. An enlarged opening gap between the side face 37 and the axial end face 46 is thus provided so as to lay a weld seam 48.

Figure 6B:
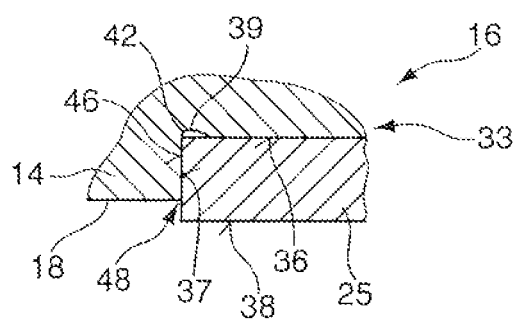

The design of the contact surface 36 in the receiving region 33 may be provided in such a way that an undercut 39 is provided in the corner region of the shoulder 42, as illustrated in FIG. 6b. For the rest, the previous embodiments apply.

FIG. 7a is a schematic sectional view of an alternative embodiment of a balancing shaft according to FIG. 5. This embodiment according to FIG. 7a differs in that the receiving region is formed by merely one contact surface 36. The raceway 25 is thus arranged in a defined position in the axial direction in relation to the balancing shaft as a result of this one contact surface 36.

Detail X in FIG. 7a corresponds to FIGS. 6a, 6b, and therefore reference can be made hereto. The opposite axial end face 46 of the raceway 25 is free in relation to the receiving region 33 and rises above the contact surface 36. FIG. 7b shows an enlarged schematic view of the detail Y in FIG. 7a. In this embodiment a welded, soldered or bonded joint can be introduced in the transition region between the axial end face 46 and the contact surface 36 of the receiving region 33. Furthermore, the contact surface 36 may alternatively only extend as far as the axial end face 46 of the raceway 25 so that improved access to form a weld seam between the raceway 25 and the main body 14 is possible. The arrangement of only one axial side face 37 in the receiving region 33 may be sufficient in some applications.

FIG. 8 shows an alternative embodiment of a balancing shaft 11 in longitudinal section. In this embodiment the receiving region 33 of the balancing shaft 11 is clearly singled out in relation to the main body 14 or is arranged so as to be offset radially outwardly. The contact surface 36 of the receiving region 33 is preferably formed in accordance with the width of the raceway 25 so that complete support may be provided in the contact region. The welded or soldered joint illustrated by way of example may contact the axial end face 46 of the raceway 25. A further material reduction of the entire balancing shaft, if necessary, is enabled as a result of this design. This contact surface 36 may also be larger or smaller than the width of the raceway 25 in the receiving region 33.

FIG. 9 shows an alternative embodiment of a balancing shaft in longitudinal section. In this embodiment a non-positive and/or positive joint is provided to position the raceway 25 in relation to the main body 14 or the bearing point 16, 17. Instead of a cohesive joint by welding or soldering, as previously described, in this embodiment the raceway 25 is fixed by pressing or caulking, as is shown in an enlarged view in FIGS. 10a and b. The receiving region 33 and the peripheral surface 18 bearing thereagainst are thus adapted to one another. In this embodiment the contact surface 36 does not bear directly against the side face 37, but is separated by an undercut 39. The contact surface 36 is, for example, continuous in the axial direction. Alternatively, only individual contact portions might also be provided. The raceway 25 comprises axial end faces 46 which, in accordance with a first embodiment (FIGS. 10a and b), are at least slightly inclined towards the running surface 38 of the raceway 25. For pressing or caulking, a notch 52 is formed in the edge region 51 after positioning of the raceway 25 in relation to the receiving region 33 and adjacent thereto so as to achieve material compression so that the side face 37 of the receiving region 33 bears against and engages with the inclined axial end face 46 of the raceway 25 with a non-positive and positive fit and thus fixes the raceway 25 in the receiving region 33.

FIGS. 10c and d show a schematic detailed view of an alternative embodiment of an end face 46 of the raceway 25. In this alternative embodiment the end face 46 comprises, for example, a one-step shoulder 47. This shoulder 47 extends, for example, over a quarter, a third or half the thickness of the raceway 25. Once the edge region 51 has been caulked, a non-positive and/or positive fixing of the raceway 25 in relation to the receiving region 33 is in turn achieved as a result of the material compression. This shoulder 47 is similar to the inclined end face 46 in terms of effect. A multi-stepped shoulder may also be formed as an alternative to the shoulder 47. Different contours may also be provided on the side face, either individually or in combination with one another, and mean that a fixing to the edge region 51 is provided after the pressing or caulking of the edge region 51, or that this contour engages the edge region of the receiving region 33 from behind. In addition, the side face formed with a contour may comprise elevations or recesses in the radial peripheral direction so that radial fixing is additionally provided.

Figure 12A:
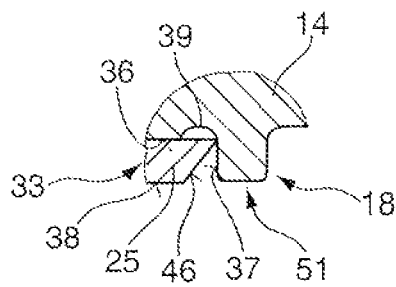
FIG. 12a is a schematically enlarged view of a detail C according to FIG. 11 before flanging.
Figure 12B:
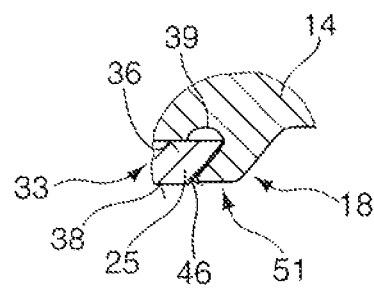
FIG. 12b is a schematically enlarged view of a detail B according to FIG. 11 after flanging.

FIG. 11 shows a further alternative embodiment of the balancing shaft 11 in longitudinal cross-section. In this embodiment the raceway 25 is fixed in relation to the receiving region 33 by a flange. The detail C according to FIG. 11 is shown in greater detail in FIGS. 12a and 12, wherein FIG. 12a shows a first manufacturing step and FIG. 12b shows the complete flange for fixing the raceway 25 in the bearing point 16, 17. To produce the flange, a peripheral bead 51 is provided on the peripheral surface 18 in the edge region which bears against the receiving region 33. As a result of this bead 51, a material collection is created which is provided for the subsequent flanging process. In order to ensure effective fixing of the raceway 25 in the receiving region 33, the raceway 25 comprises an end face 46 inclined to the running surface 38. After positioning and possible pressing-in of the raceway 25, the bead 51 is driven towards the end face 46 so that the end face 46 is held fixed in position in the receiving region 33 by a type of undercut which is formed by the flanged bead 51.

Alternatively to the embodiment illustrated in FIGS. 11, 12a and 12b, the receiving region 33 may have a side face 37 which is formed with an undercut by rotary machining so that only one flanging procedure is necessary opposite.

Figure 13A:
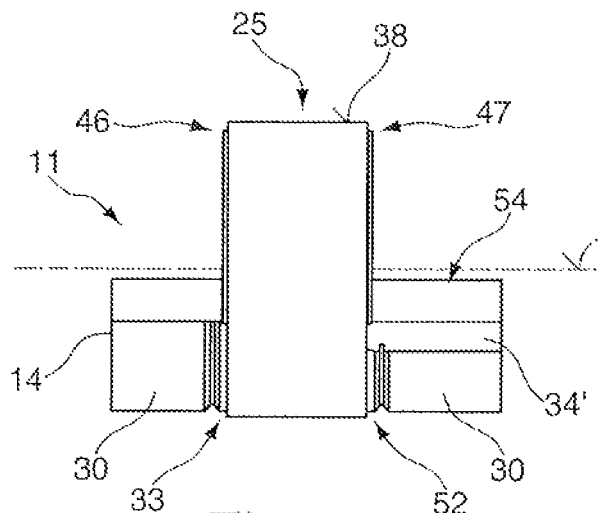
FIGS. 13a to 13c are schematic views of a further alternative balancing shaft.
Figure 13B:
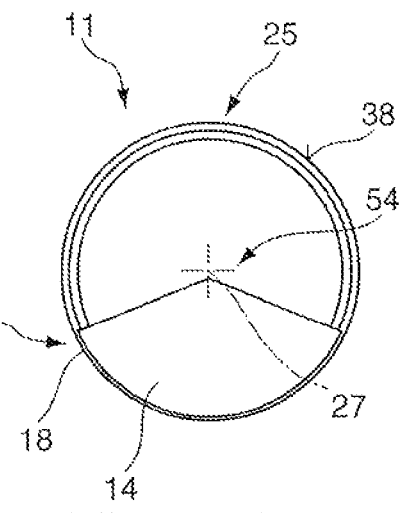
Figure 13C:
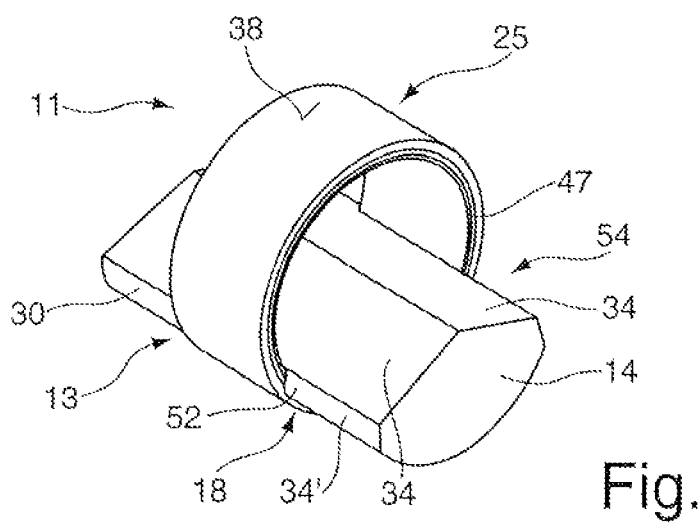

A further alternative embodiment of the balancing shaft 11 is illustrated in FIGS. 13a to c. With this balancing shaft 11, the main body 14 comprises a peripheral surface 18 in the region of the bearing point 16, 17, which peripheral surface encloses an angle of less than 180°, wherein the peripheral surface 18 lies in the region in which the centrifugal force acts. A reinforcing contour 54, which is roof-shaped in accordance with the embodiment illustrated and in particular is formed by two reverse-drawn surfaces 34, extends between the two outer ends of the peripheral surface 18. Together with the peripheral surface 18, this reinforcing contour 52 preferably forms a cross-sectional area in which the axis of rotation 27 lies outside the cross-sectional area. Such an embodiment affords the advantage that such balancing shafts 11 can be produced easily using forging techniques. Alternatively, the reinforcing contour may also form a cross-sectional area, together with the peripheral surface, wherein the axis of rotation lies within the cross-sectional area. A further reverse-drawn surface 34' may be provided adjacently between the reinforcing contour 54 and the peripheral surface 30 of the unbalanced weight portions 21, 22, 23, 24 or the peripheral surface 18, either on one or both sides. In this embodiment in FIGS. 13a to c the raceway 25 is fastened to the peripheral surface 18 on the basis of the embodiment described above in accordance with FIGS. 10c and d. The raceway 25 may also be fastened and formed in accordance with the other embodiments described above and also in accordance with the embodiments still to be described hereinafter.

Figure 14A:
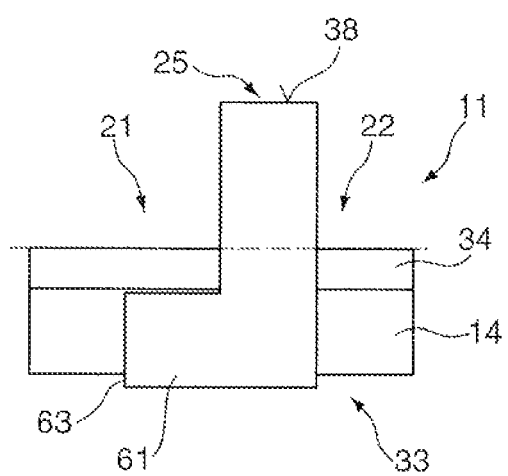
Figure 14B:
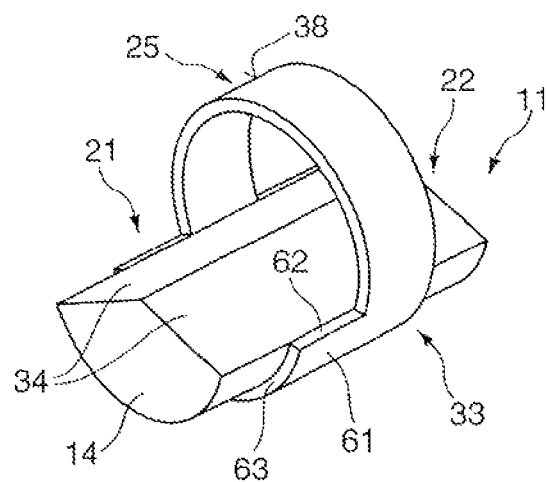

FIGS. 14a and b show a further alternative embodiment of the balancing shaft 11 in side view and perspective view. In this embodiment the geometry of the raceway 25 is modified by the additional arrangement of a support portion 61 or fastening portion. The support portion 61 may extend in the axial direction on one or both sides towards the raceway 25 extending over the entire periphery, wherein said support portion extends, at least in part, in the radial direction, but is not formed over the entire periphery. The support portion 61 preferably extends in the radial peripheral direction over the peripheral region over which the receiving region 33 extends, until the reverse-drawn surface 34 follows on. Owing to the design of the support portion 61, an enlarged fastening region can be created so as to fix the raceway 25 in the receiving region 33. For example, an additional fastening to the main body 14 may be enabled along the radial end face 61. In addition, the advantage can thus be provided that fastening regions are created outside the running surface 38 of the raceway 25, the design of which is independent of the running surface 38 of the raceway 25. The arrangement of the raceway 25 in relation to the receiving region 33 may include the embodiments described above. The embodiment illustrated in FIGS. 13a and b basically corresponds to that in FIGS. 7a and b and to the described alternatives thereto in terms of positioning and shaping.

Figure 14C:
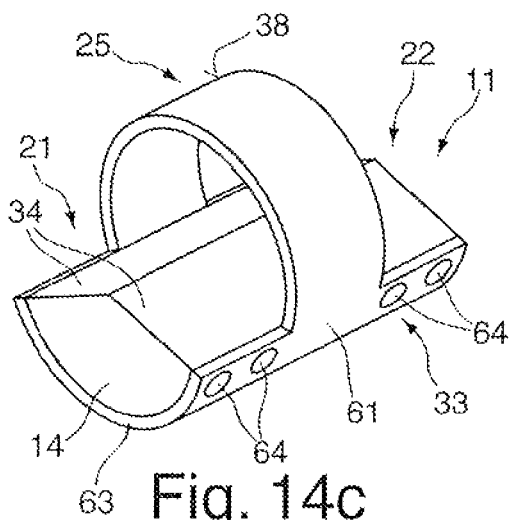

FIGS. 14c and d show perspective views of alternative embodiments to FIGS. 14a and b. In the embodiments illustrated in FIGS. 14c and d support portions 61 are provided on both sides of the raceway 25 extending over the entire periphery. In these embodiments the attachment of a weld seam, for example along the radial end face 62, is enabled. Alternatively or in addition, an axially extending weld seam may be provided along the axial end face 63. Furthermore, a bonded joint may alternatively be enabled owing to the contact of the raceway 25 over a large area. Alternatively or in addition, spot-welding may also occur, as indicated for example by the illustrated dots 64. In addition, a versatile combination of the aforementioned fastening possibilities may also be provided.

Figure 14D:
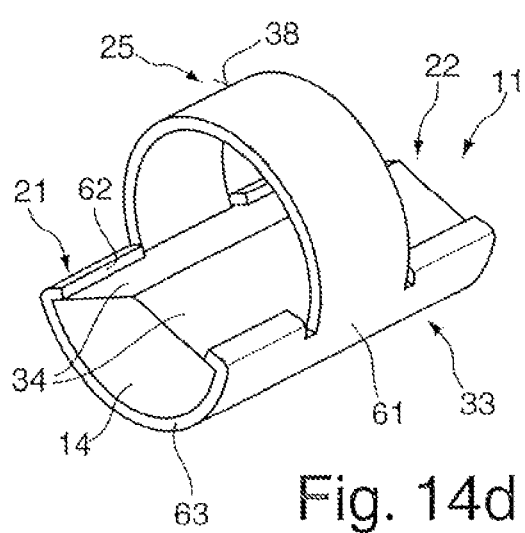

FIG. 14d shows a further alternative embodiment for fixing the raceway 25 to the receiving region 33, in which the end face 62 is flanged so that a radial and/or axial fixing of the raceway 25 in relation to the receiving region 33 is provided. In addition to the flanging, a weld seam, a bonded joint and/or a spot-welded joint may also be provided.

Figure 14E:
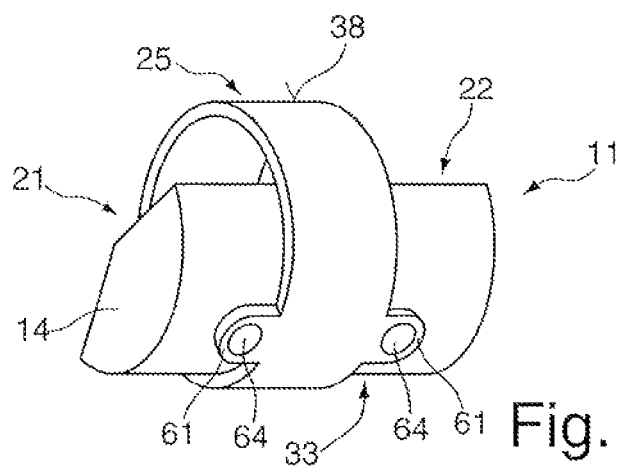

FIG. 14e shows a schematic, simplified view of a further alternative design of the fastening of the raceway 25 to the balancing shaft 11. In this embodiment support portions or fastening portions 61 formed as tabs are provided on the raceway 25 and are fixed to the main body 14 of the balancing shaft 11 by spot-welds, rivets, screws or the like.

FIGS. 15a to d show different embodiments of a raceway 25 by way of example. Instead of a raceway 25 with a constant width, a raceway 25 which is formed with constant width in the region of the unbalanced weight portions 21, 22, 23, 24 and then in the opposite region or in the region opposite the effective centrifugal force has a reduced web portion which extends as far as the upper vertex 71 may be provided by way of example in accordance with FIG. 15a. In this embodiment the reduction in width of the raceway 25 only occurs outside the receiving region 33. Alternatively to the contour illustrated in FIG. 15a, in which a transition region is provided between the narrow and wide portions of the raceway 25, the tapering region may also taper continuously and discontinuously as far as the point 17, instead of the tapering illustrated. FIG. 15b shows an alternative embodiment of a raceway 25 compared to FIG. 15a. In this case two web-like raceway portions are formed outside the receiving region 33 for example.

FIG. 15c shows a further alternative embodiment of the raceway 25. In this case, the width of the raceway tapers continuously from the lowest point of the unbalance within the receiving region 33 as far as the opposed point 71. This tapering may also be discontinuous and also asymmetrical. For example, an alternative embodiment is illustrated in FIG. 15d, in which only a one-sided decrease in the width of the raceway 25 is provided and may be continuous or discontinuous.

FIG. 15e shows an alternative embodiment to FIGS. 14a and b, in which the running surface 38 of the raceway 25 arranged outside the receiving region 33 is formed with a decreasing width towards the point 71 instead of with a constant width. The alternative embodiments above of the raceway 15a to d outside the receiving region 33 may also be provided in the embodiment according to FIG. 15e with support portions 61 extending on both sides and with support portions 61 extending only on one side.

FIG. 16a shows a perspective detail of an alternative embodiment of a balancing shaft 11 compared to that of FIG. 1. This balancing shaft 11 corresponds to the basic structure of the balancing shaft 11 in FIG. 1 and comprises an end portion 13, to which an unbalanced weight portion 24 connects. The bearing point 16 receives a rolling bearing 76 instead of a raceway 25. A further unbalanced weight portion 23 and/or a connection portion 19 are connected. The rolling bearing 76 is fastened via its inner ring, which can be equated with the raceway 25 in terms of function, in a manner similar to that of the fastening of the raceway 25, as described in the previous embodiments in accordance with FIGS. 1 to 13c.

FIG. 16b is a schematic partial sectional view showing a first assembly position 77 and a second assembly position 78 of the rolling bearing 76 so as to position and fix the rolling bearing 76 in the receiving region 33 of the bearing point 16. FIG. 16c shows a schematic sectional view of the first assembly position 77, and FIG. 16d shows a sectional view of the bearing point 16 and the second assembly position 78.

In this embodiment, for example, the peripheral angle over which the peripheral surface 18 of the bearing point 16 extends is greater than the peripheral angle of the peripheral surface 30 of the unbalanced weight portion 24. In this embodiment the peripheral surface 30 of the unbalanced weight portion 24 extends directly as far as an end face of the end portion 13. Alternatively, this may also be reversed or the peripheral angle of the peripheral surfaces 18, 30 may be identical. It can be seen from FIG. 16c that a reverse-drawn diameter in the region of the end portion 13 is smaller than an inner diameter of the raceway 25 or the inner ring of the rolling bearing 76. The same applies to the design of the peripheral surface 18 and the reverse-drawn surfaces 34 in the bearing point 16, as is also shown in FIG. 16c. The rolling bearing 76 or the raceway 25 may first be transferred over the end portion 13 into a first assembly position 77. A further positioning of the rolling bearing 76 or raceway 25 in the axial direction as far as the bearing point 16 then occurs. The raceway 25 or rolling bearing 76 is then placed in a position oriented vertically thereto so as to adopt the second assembly position 78. The subsequent fastening of the raceway 25 or of the rolling bearing 76 in the receiving region 33 is achieved in accordance with the embodiments described above. FIG. 16d is a sectional view along line I-I in FIG. 16b, again indicating the assembly position 78.

Alternatively, a further reverse-drawn surface 34' may also be provided in such an embodiment of the balancing shaft according to FIG. 16a, as is illustrated for example in FIG. 13c. The same applies to the bearing point 16.

The observance of the reverse-drawn diameter may also be provided in an embodiment in which a further unbalanced weight portion is connected to the bearing point 16 and in which a further bearing point is then formed instead of a connection point 19. The features and alternatives described above also apply to such an embodiment.

The embodiments, described by way of example, of the receiving region and of the non-positive and/or positive and/or cohesive fixing options of the raceway 25 in the receiving region 33 may also be provided in all embodiments and alternatively may be provided in the balancing shaft described in WO 2007/121861 A1.

The invention claimed is:

1. A balancing shaft for a single- or multi-cylinder engine comprising at least one unbalanced weight portion and at least one bearing point, which is associated with the at least one unbalanced weight potion, the bearing point comprising a radial peripheral surface which extends, only in part, over a periphery of the bearing point so that a centrifugal force resulting from rotation of the balancing shaft is situated in a region of the bearing point which is formed by the peripheral surface extending, in part, over the periphery of the bearing point, and comprising a raceway which surrounds the partially formed peripheral surface of the bearing point and is connected to the bearing point by a non-positive and/or positive and/or cohesive joint, wherein the peripheral surface of the bearing point comprises a receiving region for receiving the raceway, and at least an axially outer edge region or at least an annular region of the raceway which is connected to at least an axial side surface of the receiving region with a non-positive and/or positive and/or cohesive fit or in that the raceway comprises a support portion in the axial direction on its running surface and adjacent thereto, which support portion extends in the radial direction, at least in part, but does not extend over the entire periphery and is connected to the receiving region or the main body.

2. The balancing shaft according to claim 1, wherein at least one reverse-drawn surface is provided adjacent to the peripheral surface of the bearing point in the peripheral direction and reduces the cross-sectional area of the bearing point.

3. The balancing shaft according to claim 1, wherein the receiving region is recessed and comprises at least one contact surface which is annular and extends along the width of the receiving region, at least in part.

4. The balancing shaft according to claim 3, wherein the contact surface of the receiving region is offset radially inwardly from the axis of rotation in relation to the peripheral surface, in such a way that a running surface of the raceway protrudes radially in relation to the adjacent peripheral surface.

5. The balancing shaft according to claim 3, wherein a radial contact surface bears against an axial side face of the receiving region and forms a contact shoulder for the raceway.

6. The balancing shaft according to claim 1, wherein at least one axial end face of the raceway is positioned on at least one axial side face of the receiving region.

7. The balancing shaft according to claim 1, wherein the raceway, placeable in the receiving region, which is recessed, and treated by a hardening procedure, comprises an untreated edge region.

8. The balancing shaft according to claim 1, wherein the contact surface of the receiving region is raised or radially prominent in relation to an adjacent portion of the balancing shaft.

9. The balancing shaft according to claim 1, wherein, to fix the raceway in the receiving region, a flange is provided on the edge region adjacent to the receiving region, in particular by a bead arranged on the peripheral surface.

10. The balancing shaft according to claim 9, wherein a single- or multi-stepped contour or at least one end face inclined to the running surface, which is peripheral, at least in part, is provided on the at least one end face of the raceway and acts as an undercut after providing the flange of an adjacent edge region.

11. The balancing shaft according to claim 1, wherein at least one radial or axial end face of the support portion is connected to the receiving region or main body.

12. The balancing shaft according to claim 1, wherein the peripheral surface of the bearing point has a peripheral angle of less than 180°.

13. The balancing shaft according to claim 12, wherein a reinforcing contour extends between the radial ends of the peripheral surface of the bearing point, which reinforcing contour is roof-shaped, is curved in the opposite direction to the peripheral surface, is curved outwardly or is polygonal or the like.

14. The balancing shaft according to claim 13, wherein the reinforcing contour and the peripheral surface form a cross-sectional area of the bearing point, the axis of rotation of the main body lying outside the cross-sectional area or adjacent to the reinforcing contour.

15. The balancing shaft according to claim 1, wherein an end portion and/or an adjacent unbalanced weight portion and/or an adjacent bearing point each have a reverse-drawn diameter which is smaller than an inner diameter of the raceway or of an inner ring of a rolling bearing.

* * * * *